United States Patent [19]
Murakami et al.

[11] Patent Number: 5,709,447
[45] Date of Patent: Jan. 20, 1998

[54] LIGHTING DEVICE

[75] Inventors: Akira Murakami; Yoshihiro Shirai, both of Yamatokoriyama, Japan

[73] Assignee: Sharp Kabushiki Kaisha, Osaka, Japan

[21] Appl. No.: 565,674

[22] Filed: Nov. 30, 1995

[30] Foreign Application Priority Data

Nov. 30, 1994 [JP] Japan ............... 6-297545

[51] Int. Cl.$^6$ .................................... F21V 8/00
[52] U.S. Cl. ................................. 362/31; 362/26
[58] Field of Search ............... 362/31, 26; 359/48, 359/49; 40/546

[56] References Cited

U.S. PATENT DOCUMENTS

| | | | |
|---|---|---|---|
| 3,040,168 | 6/1962 | Stearns | 40/546 |
| 5,178,447 | 1/1993 | Murase et al. | 362/31 |
| 5,363,294 | 11/1994 | Yamamoto et al. | 362/31 |

FOREIGN PATENT DOCUMENTS

| | | |
|---|---|---|
| 3-68923 | 3/1991 | Japan . |
| 3-67381 | 7/1991 | Japan . |
| 6-174929 | 6/1994 | Japan ............... 359/49 |
| 6-208113 | 7/1994 | Japan . |

*Primary Examiner*—Ira S. Lazarus
*Assistant Examiner*—Sara Sachie Raab
*Attorney, Agent, or Firm*—David G. Conlin; George W. Neuner

[57] ABSTRACT

The object of the present invention is to obtain high luminance with low power consumption. Convexes are formed on one side face of a light-guiding plate on a light source side of the light-guiding plate. The convexes are formed at minute pitches in parallel with the longitudinal direction of the one side face. An isosceles right triangle is selected as the sectional shape of the convexes. Light having entered from the one side face is diffused and reflected by a diffuse reflection layer, and light reflected by a reflection plate is emitting from a light-outgoing surface. The light having entered from the one side face is also directly emitted from the light-outgoing surface. The emitted light is diffused by a diffusion plate to irradiate, for example, the side opposite to the display side of a liquid crystal display panel in which the lighting device of the invention is to be incorporated. By making the one side face of the light-guiding plate uneven, the quantity of light entering the light-guiding plate and the quantity of light emitting from the light-guiding plate can be increased and the luminance of the lighting device can be enhanced.

4 Claims, 5 Drawing Sheets

LIGHTING DEVICE

BACKGROUND OF THE INVENTION

1. Field of the Invention

The present invention relates to a lighting device for use in plane display apparatuses, such as liquid crystal display apparatuses, AV (audio-visual) apparatuses and advertising display apparatuses.

2. Description of the Related Art

Conventionally, a lighting device capable of flatly throwing light to display apparatuses of transmission and semi-transmission types is incorporated in information terminal apparatuses, such as personal computers and word processors, which perform displaying on planes. When great account is made of portability, an edge light type is frequently adopted in order to make the apparatus thinner and lighter.

FIG. 6 is a sectional view showing the structure of a lighting device 1 of a conventional embodiment. The edge light type is adopted for the lighting device 1. The lighting device 1 comprises a light-guiding plate 2, a light source 3, a reflection plate 4, a diffuse reflection layer 5, a reflection plate 6 and a diffusion plate 7. The light-guiding plate 2 implemented by means of a light-passing material, such as an acrylic resin, is nearly flat, the distance between the light-outgoing surface 2d of the light-guiding plate 2 and a surface to be irradiated by the lighting device 1, such as the surface of a liquid crystal display panel, is made constant, and the light-guiding plate 2 is made thinner in the direction from one side face 2a thereof to the other side face 2b opposite to the side face 2a. By using this kind of shape, light from the light source 3, which will be described later, is uniformly emitted from the light-outgoing surface 2d of the light-guiding plate 2.

The light-outgoing surface 2d of the light-guiding plate 2 is disposed nearly horizontally on the surface of a liquid crystal display panel. On the side of the one side face 2a, that is, on the thicker side, a linear light source 3 implemented, for example, by a cold cathode tube, is disposed in the longitudinal direction of the one side face 2a with a spacing provided between the light source 3 and the light-guiding plate 2. The one side face 2a of the light-guiding plate 2 is relatively smooth and nearly perpendicular to the light-outgoing surface 2d. In addition, the diffuse reflection layer 5 is provided on a surface 2c opposite to the light-outgoing surface 2d of the light-guiding plate 2. The diffuse reflection layer 5 has light-passing regions 5a and light-shielding regions 5b. The light-passing regions 5a and light-shielding regions 5b are arranged in a matrix form. The widths of the regions 5a, 5b and the spacings between them are selected so that light from the light-outgoing surface 2d of the light-guiding plate 2 is uniform.

On the side of the light-outgoing surface 2d of the light-guiding surface 2, the diffusion plate 7 made, for example, of PET (polyethylene terephthalate), is disposed. The reflection plate 6 implemented by a metal plate coated, for example, with a white PET sheet or white paint, is provided so as to cover the diffuse reflection layer 5 provided on the surface 2c of the light-guiding plate 2 and the other side face 2b of the light-guiding plate 2. Furthermore, the reflection plate 4 implemented, for example, by a reflection sheet having a high reflectivity or a plastic plate having a high reflectivity, is provided so as to cover a surface of the light source 3, which does not face the light-guiding plate 2, so that light from the light source 3 wholly enters the light-guiding plate 2.

Light from the light source 3 directly enters the light-guiding plate 2 via an air layer between the light source 3 and the light-guiding plate 2 or the light is reflected by the reflection plate 4 and enters the light-guiding plate 2 from the one side face 2a thereof. The incoming light is diffused and reflected by the diffuse reflection layer 5 and further reflected by the reflection plate 6, then emitted from the light-outgoing surface 2d of the light-guiding plate 2. The incoming light is also emitted directly from the light-outgoing surface 2d. The outgoing light is diffused by the diffusion plate 7 and emitted to a surface opposite to the display surface, for example, of the transmission or semi-transmission type liquid crystal display panel of a liquid crystal display apparatus, in which the lighting device 1 is incorporated. The light having entered the liquid crystal display panel is transmitted or shielded depending on the arrangement conditions of liquid crystals and the display panel performs displaying in accordance with the brightness determined by the transmission or shutoff of the light.

In the lighting device 1, a light-gathering layer for gathering light emitted from the light-guiding plate 2 may be provided on the diffusion plate 7 on the light-guiding plate 2.

FIG. 7 is a sectional view showing the structure of a lighting device 9 of another conventional embodiment. In the lighting device 9, a light-guiding plate 8 is provided instead of the light-guiding plate 2. The light-guiding plate 8 is uniform in thickness, one side face 8a of the light-guiding plate 8, which corresponds to the one side surface 2a of the light-guiding plate 2 and is disposed to face the light source 3, is relatively smooth and inclined.

FIG. 8 is a sectional view showing the structure of a lighting device 11 of still another conventional embodiment. In the lighting device 11, a light-guiding plate 10 is provided instead of the light-guiding plate 2. Like the light-guiding plate 2, the light-guiding plate 10 is thinner in the direction from one side face 10a thereof to the other side face 10b thereof, and the one side face 10a disposed to face the light source 3 has a semicylindrical shape which is obtained by cutting off a cylinder in the direction of its height.

The light-guiding plates 8, 10 of these lighting devices 9, 11 have been proposed to increase the quantity of light entering the light-guiding plates. The above-mentioned shapes are disclosed in "SID 94 DIGEST. 281." In addition, the lighting device 11 is disclosed in Japanese Unexamined Utility Model Publication JPU 3-333315 (1991), which was applied by the applicants of the present invention. Furthermore, an embodiment wherein a pattern of special ink is formed as the diffuse reflection layer 5 is disclosed. For example, in Japanese Unexamined Patent Publication JPA 3-68923 (1991), an embodiment wherein the diffuse reflection layer 5 is formed by etching or transferring is disclosed. Moreover, an embodiment wherein a sheet having minute prisms made of one or two sheets of polycarbonate (PC) is provided on the light-outgoing surface of the light-guiding plate as the above-mentioned light-gathering layer is disclosed. For example, in Japanese Unexamined Patent Publication JPA 6-208113 (1994), an embodiment wherein prisms are directly formed on the light-outgoing surface of the light-guiding plate is disclosed.

In the case of the above-mentioned lighting device 1, although light from the light source 3 enters the light-guiding plate 2 from the one side face 2a of the light-guiding plate 2, since the one side face 2a is formed perpendicularly to the light-outgoing surface 2d, the quantity of light reflected by the one side face 2a is relatively large.

Furthermore, the quantity of light traveling to the other side face 2b is also large. The probability that the incoming light reaches the diffuse reflection layer 5 and the reflection plate 6 disposed on the side of the surface 2c opposite to the light-outgoing surface 2d and the probability that the incoming light is emitted from the light-outgoing surface 2d are relatively low. On the other hand, in the cases of the lighting devices 9, 11, the amounts of light reflected by the one side faces 8a, 10a of the light-guiding surfaces 8, 10 are smaller than that in the case of the lighting device 1. Besides, the probability that the incoming light reaches the diffuse reflection layer 5 and the reflection plate 6 and the probability that the incoming light is emitted from the light-outgoing surface are high.

In this way, in the case of the lighting devices 9 and 11, the quantity of light entering the light-guiding plate and the quantity of light emitted from the light-guiding plate are larger than those in the case of the lighting device 1. However, when the lighting devices 9 and 11 are used as light sources for liquid crystal display apparatuses or the like, the improvement in luminance due to such increases in quantity of light is insufficient. Therefore, a highly luminous light source with high power consumption is required to obtain sufficient luminance. Consequently, the problem of increased power consumption occurs when such a display apparatus is considered as a whole.

Additionally, in the lighting device 9 shown in FIG. 7, since the side face 8a of the light-guiding plate 8 is inclined, the inclined portion cannot be used as a light-outgoing region for an actual light. As a result, the device is required to be enlarged in size. In the case of the lighting device 1 not having such an inclined portion, light having entered the light-guiding plate 2 reaches a relatively far-away location. However, since the lighting device 9 is provided with the inclined portion mentioned above, the incoming light does not reach such a far-away location. For this reason, the light cannot be emitted uniformly.

SUMMARY OF THE INVENTION

The object of the present invention is to provide a lighting device capable of obtaining high luminance with low power consumption.

The invention provides a lighting device comprising a nearly flat light-guiding plate, a linear light source disposed on the side of a side face of the light-guiding plate in the longitudinal direction of the side face, and a reflection plate disposed on the side of one surface of the light-guiding plate so as to cover at least the one surface; the lighting device which guides light having entered from the side face of the light-guiding plate to the entirety of the light-guiding plate, and emits the light through the other surface of the light-guiding plate by reflecting by the reflection plate, wherein convexes are formed at minute pitches on the side face of the light-guiding plate disposed to face the light source, in parallel with the longitudinal direction of the side face.

It is preferable in the invention that the sections of the convexes taken in a plane parallel to the direction perpendicular to the longitudinal direction of the side face of the light-guiding plate disposed to face the light source are nearly triangular.

Further it is preferable in the invention that the lighting device further comprises a diffuse reflection layer having light-shielding regions formed on the one surface of the light-guiding plate, the light-shielding regions being disposed at equal intervals on respective imaginary lines which are parallel with the linear light source at equal intervals, and the number D of the imaginary lines and the number N of the convexes formed on the side face of the light-guiding plate satisfy the following relationship:

$$0.5D \leq N \leq 2D$$

According to the invention, the light from the light source enters into the light-guiding plate through the uneven side face thereof on which the convexes are formed. The light source is linear and disposed in the longitudinal direction of the side face of the light-guiding plate, and the convexes on the side face of the light-guiding plate are arranged at minute pitches in parallel with the longitudinal direction of the side face. The light having entered into the light-guiding plate is reflected by the reflection plate disposed on the side of the one surface of the light-guiding plate so as to cover the one surface and then emitted through the other surface opposite to the one surface, or emitted directly from the other surface.

By making the side face of the light-guiding plate on the light source side uneven, the quantity of the light entering into the light-guiding plate per time is relatively increased. Consequently, the quantity of outgoing light increases with the result that the luminance of the device is enhanced. Additionally, since the light-incoming face of the light-guiding plate is uneven, the probability that the incident light reaches the one surface and the other surface of the light-guiding plate is relatively high. As a consequence, the quantity of the light emitted from the other surface is also increased with the result that the luminance is enhanced. Since the luminance is thus enhanced along with increasing the quantity of the outgoing light by controlling the shape of the side face of the light-guiding plate, such high luminance can be obtained with relatively low power consumption.

Additionally it is preferable that the sections of the convexes taken in a plane parallel to the direction perpendicular to the longitudinal direction of the side face of the light-guiding plate disposed to face the light source are selected to be nearly triangular, and it is confirmed that the luminance is enhanced when such a triangular shape is employed.

In addition, according to the invention, the lighting device further comprises a diffuse reflection layer having light-shielding regions formed on the one surface of the light-guiding plate, and the number D of the imaginary lines on which the light-shielding regions are arranged and the number N of the convexes of the light-guiding plate are selected so as to satisfy the relationship of $0.5D \leq N \leq 2D$. Consequently, a larger quantity of light can be taken in the light-guiding plate, the luminance of the lighting device can be enhanced, and the luminance values at all points on the light-outgoing surface of the light-guiding plate are made nearly equal. The lighting device can thus emit light having uniform luminance from the light-outgoing surface.

A sufficient luminance can be obtained in this kind of lighting device without requiring much power consumption. The lighting device can thus be driven with low power. Therefore, the lighting device can be built in a display apparatus for displaying by passing and shielding light or the like. Such a display apparatus in which the lighting device is incorporated can realize high luminance display with low power consumption.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
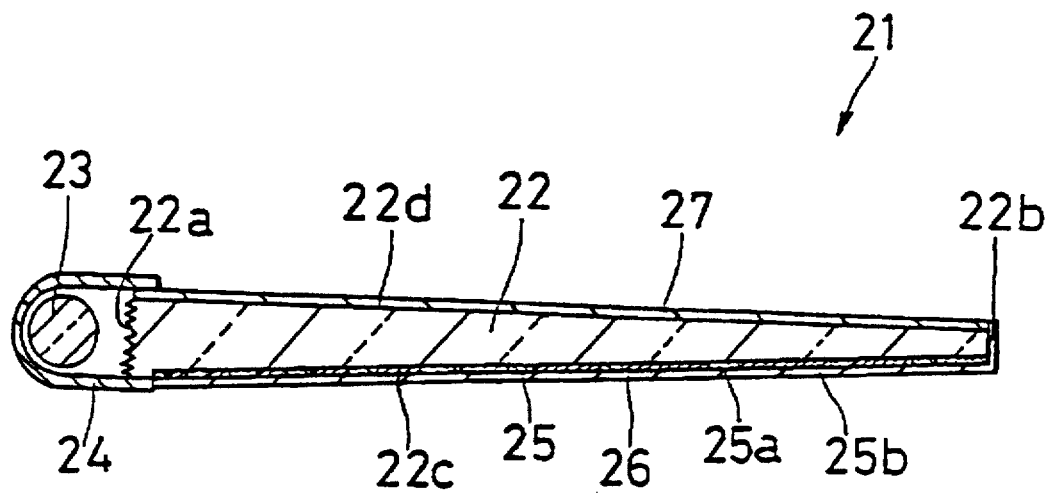
FIG. 1 is a sectional view showing the structure of a lighting device 21 of an embodiment of the present invention.

Now referring to the drawings, preferred embodiments of the invention are described below.

Figure 2:
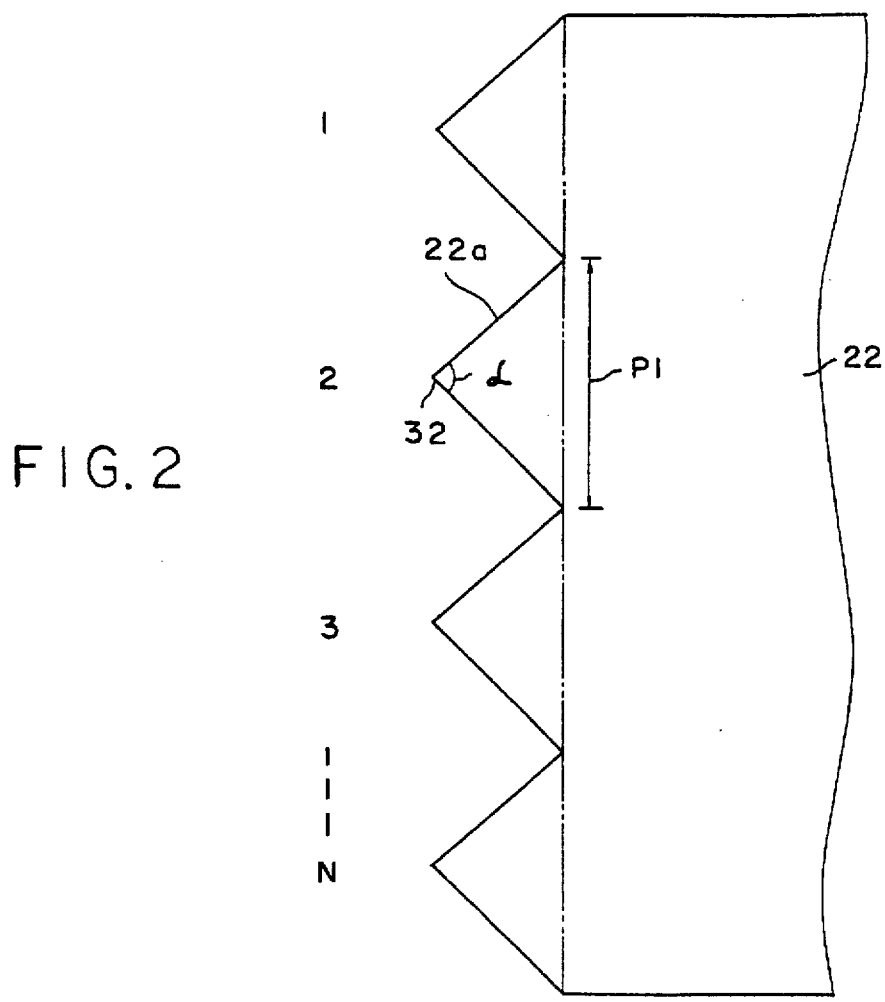
FIG. 2 is an enlarged side view showing one side face 22a of a light-guiding plate 22 of the lighting device 21.
Figure 3:
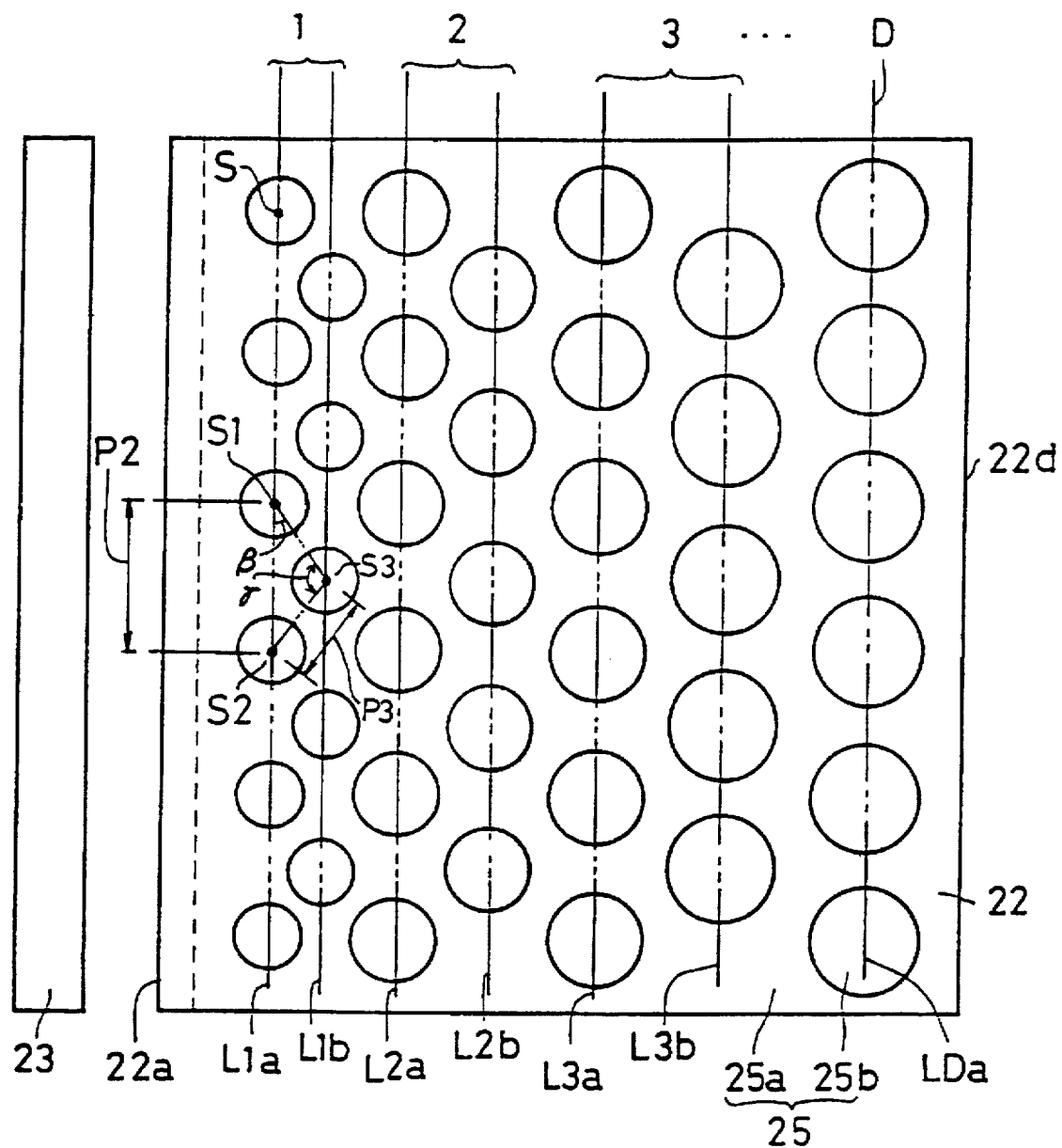
FIG. 3 is a plan view showing the light-guiding plate 22, a light source 23 and a diffuse reflection layer 25 of the lighting device 21.

FIG. 1 is a sectional view showing the structure of a lighting device 21 of an embodiment of the present invention. FIG. 2 is an enlarged side view showing one side face 22a of a light-guiding plate 22 included in the lighting device 21. Furthermore, FIG. 3 is a plan view showing the light-guiding plate 22, a light source 23 and a diffuse reflection layer 25 of the lighting device 21.

The lighting device 21 comprises the light-guiding plate 22, light source 23, reflection plate 24, diffuse reflection layer 25, reflection plate 26 and diffusion plate 27. The light-guiding plate 22 implemented by a light-transmitting material such as an acrylic resin (e.g., Sumitex supplied by Sumitomo Chemical Co., Ltd.) is made to be nearly flat by injection molding or the like so that the light-guiding plate is thinner in the direction from the one side face 22a to the other side face 22b opposite to the side face 22a in the case where the distance between the light-outgoing surface 22d of the light-guiding plate 22 and a surface to be irradiated by the lighting device 21 such as a surface of a liquid crystal display panel is constant, and the light-guiding plate 22 is formed, for example, by an injection molding method so that the light-guiding plate 22 is made thinner in the direction from the one side face 22a thereof to the other side face 22b opposite to the side face 22a. The thickness of the one side face 22a is set, for example, to 4 mm, and the thickness of the other side face 22b is set, for example, to 1.5 mm. Furthermore, convexes 32 are formed on the one side face 22a at minute pitches in parallel with the longitudinal direction of the one side face 22a. These convexes 32 function as prisms. For example, an isosceles right triangle is selected as the sectional shape of the convexes 32 in the plane parallel with the direction perpendicular to the longitudinal direction of the one side face 22a. That is, 90 degrees is selected as the vertical angle $\alpha$ of the convex as shown in FIG. 2. In addition, the pitch P1 of the convexes 32 or the pitch P1 of the concaves formed by the convexes is set, for example, to 50 µm. The conditions of the convexes 32 such as shape, projecting direction, and size are not limited to those described above, but selectively determined so that a larger quantity of light out of the light from the below mentioned light source 23 enters into the light-guiding plate 22 and is emitted uniformly from the light-outgoing surface 22d of the light-guiding plate 22. For example, N convexes 32 are provided.

On the side of the one side face 22a, that is, on the thicker side of the light-guiding plate 22, is arranged a linear light source 23 implemented, for example, by a cold cathode tube, is disposed apart from the light-guiding plate 22 in the longitudinal direction of the one side face 22a of the light-guiding plate 22. In the present embodiment, a light source having an outer diameter of 3 mm is used as the light source 23. The light source 23 is implemented, for example, by a product supplied by Toshiba Lighting and Technology Corporation under the trade name "FC2EX59/222T3/U3". In addition, on the surface 22c opposite to the light-outgoing surface 22d of the light-guiding plate 22, the diffuse reflection layer 25 is disposed.

The diffuse reflection layer 25 has a light-passing region 25a and light-shielding regions 25b. Circular patterns of a resin including a white or gray pigment are printed on the surface 22c of the light-guiding plate 22. The regions wherein the circular patterns of the resin are printed are used as the light-shielding regions 25b. The region other than the light-shielding regions 25b is the light-passing region 25a. The light-shielding regions 25b are provided, for example, in accordance with the following arrangement. Supposing mutually parallel lines L1a, L1b, . . . , LDa, LDb arranged in order from the side of the side face 22a at equal intervals, the center points S of the circular light-shielding regions 25b are disposed on the mutually parallel lines excluding the last line LDb, and the adjacent center points S on each line are arranged at an equal spacing of pitch P2. Furthermore, the center points S on lines adjacent to each other are shifted by a half pitch from each other. The circular light-shielding regions 25b arranged on a line are equal in size, and the circular light-shielding regions 25b are made larger in size as they are arranged in the direction from the side face 22a to the side face 22b. Two lines L1a, L1b arranged beginning from the side of the side face 22a, wherein the center points of the light-shielding regions 25b on line L1a are shifted by a half pitch from those on line L1b, are hereafter referred to as line L1. In the same way, the following two lines L2a, L2b are referred to as line L2. The last one line LDa is referred to as line LD. That is to say, the number of lines L amounts to D, which is a positive integer.

Furthermore, the light-shielding regions 25b of the diffuse reflection layer 25 are formed by uniformly printing a predetermined resin having a thickness of, for example, about 7 µm. The ratio (printing ratio) of the total area of the light-shielding regions 25b to the total area of the light-passing region 25a and the light-shielding regions 25b, that is, to the whole area of the surface 22c of the light-guiding plate 22 is selected generally to be within the range of 24.6% to 100%.

Lines L1a, L1b constituting line L1 are now taken as examples for convenience of explanation, the center points of two light-shielding regions 25b adjacent to each other on line L1a are designated by S1 and S2, and the center point of the light-shielding region 25b on line L1b, which is shifted by a half pitch from the center points on line L1a and disposed between the center points S1 and S2, is designated by S3. A triangle formed by connecting center points S1, S2 and S3 is an isosceles triangle. The angles at vertexes S1, S2 are designated as $\beta$, and the angle at vertex S3 is designated as $\gamma$. Angles $\beta$ and $\gamma$ are set, for example, to 45 and 90 degrees, respectively. Accordingly, the distance between center points S1 and S2 is pitch P2. When the distance between center points S1 and S3, or the distance between center points S2 and S3 is designated by pitch P3, a relationship of P2:P3=$\sqrt{2}$:1 is established. When P3=1 mm, P2 is $\sqrt{2}$ mm ($\approx$1.41 mm). This kind of relationship is also established between lines L1b and L2a, and between lines L2a and L2b. That is, the relationship is established between any two adjacent lines among lines L1a, L1b, . . . , LDa.

Moreover, the above-mentioned light-shielding regions 25b are formed away from the fringes of the surface 22c of the light-guiding plate 22 by a predetermined length, a spacing, for example, of 10 mm. The diffuse reflection layer 25 comprising the light-shielding regions 25b thus formed and the light-passing region 25a corresponding to the area of the surface 22c excluding the area of the light-shielding regions 25b is formed so as to be used in a flat display apparatus wherein a region to be irradiated, that is, a display region, has a diagonal length, for example, of 9.4 inches.

Although the light-shielding regions 25b of the diffuse reflection layer 25 are arranged, for example, in a matrix form, as described above, the widths (diameters) of the regions 25b and the spacings between them are selected so that light is uniformly emitted from the light-outgoing surface 22d of the light-guiding plate 22. In addition, although the light-shielding regions 25b are formed, for example, by printing a resin containing a pigment on the surface 22c of the light-guiding plate 22 as described above, the shielding regions 25b can also be integrated with the light-guiding plate 22 when the light-guiding plate 22 is formed. On the side of the light-outgoing surface 22d of the light-guiding plate 22, the diffusion plate 27 implemented, for example, by a product supplied by Kimoto Co., Ltd. under the trade name "100S", is disposed.

Additionally, the reflection plate 26 implemented, for example, by a white PET sheet, is provided so as to cover the diffuse reflection layer 25 provided on the surface 22c of the light-guiding plate 22 and the other side face 22b of the light-guiding plate 22. Moreover, the reflection plate 24 implemented, for example, by a reflection sheet having a high reflectivity or a plastic plate having a high reflectivity, are provided so as to cover the surface of the light source 23, which does not face the light-guiding plate 22, so that light from the light source 23 wholly enters into the light-guiding plate 22 from the one side face 22a thereof. The reflection plate 26 is implemented, for example, by a product supplied by Kimoto Co., Ltd. under the trade name "Defu-White 188" and the reflection plate 24 is implemented, for example, by a product supplied by the same company under the trade name "Defu-White 75C".

Light from the light source 23 directly enters into the light-guiding plate 22 via an air layer between the light source 23 and the light-guiding plate 22 or the light is reflected by the reflection plate 24 and enters into the light-guiding plate 22 from the one side face 22a thereof. The incoming light is diffused and reflected by the diffuse reflection layer 25 and further reflected by the reflection plate 26, then emitted from the light-outgoing surface 22d of the light-guiding plate 22. The incoming light is also emitted directly from the light-outgoing surface 22d. The outgoing light is diffused by the diffusion plate 27 and emitted to a surface opposite to the display surface, for example, of the transmission or semi-transmission type liquid crystal display panel of a liquid crystal display apparatus in which the lighting device 21 is built. The light having entered the liquid crystal display panel is transmitted or shielded depending on the arrangement conditions of liquid crystals and the display panel performs displaying in accordance with the brightness determined by the transmission or shield of the light.

The number N of the convexes 32 and the number D of lines L are set so that the following relationship is satisfied:

$$0.5D \leq N \leq 2D$$

When the thickness of the light-guiding plate 22 on the side of the side face 22a thereof is set to 4 mm, and pitch P of the convexes 32 is set, for example, to 50 μm, the value of N is obtained: N=4 mm/50 μm=80. As a result, the number D of lines L is selected in the range of 40 to 160. In case the relationship of $0.5D \leq N$ is not satisfied, the quantity of light entering the light-guiding plate 22 becomes significantly small, and the luminance of the lighting device 21 is lowered undesirably. In case the relation of $N \leq 2D$ is not satisfied, light emitted from the lighting device 21 becomes nonuniform, causing an undesirable result of generating portions having high luminance and portions having low luminance. When the lighting device 21 is designed actually, the number D of lines L will be selected after the number N of the convexes 32 is determined.

Figure 4A:
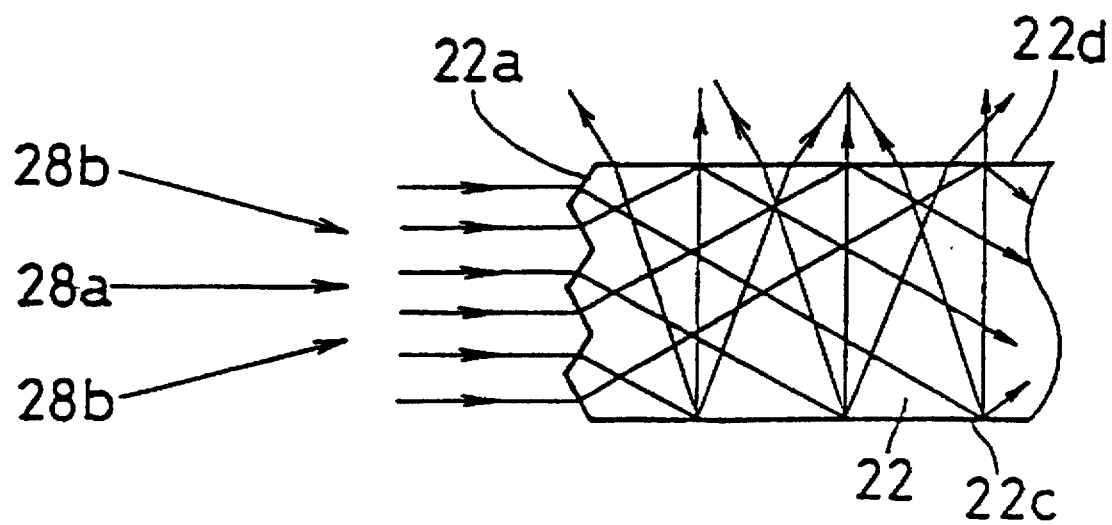
FIGS. 4A and 4B are schematic views showing the passages of light beams entering the light-guiding plate.
Figure 4B:
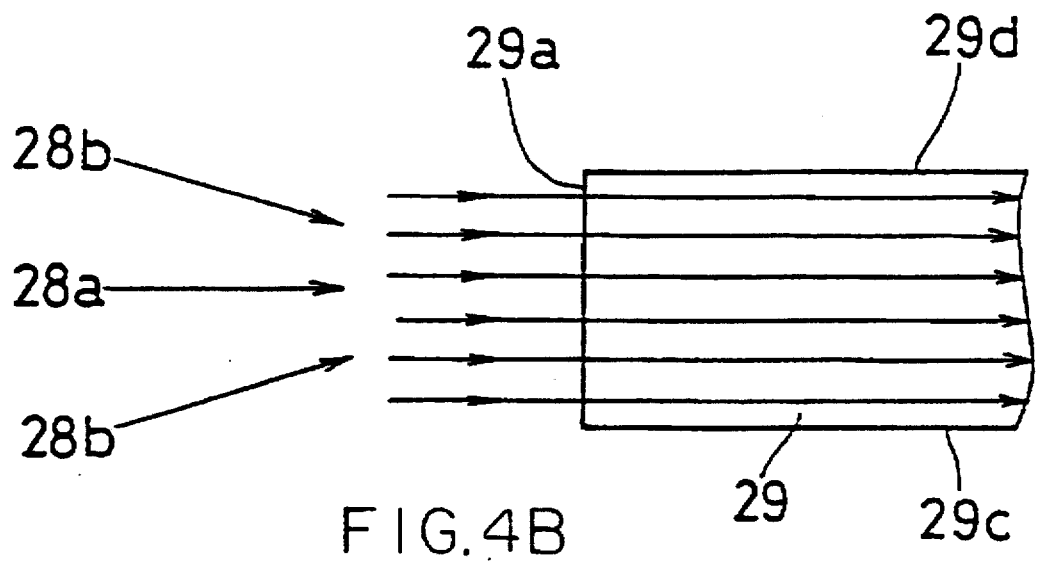

FIGS. 4A and 4B are schematic views showing passages of light having entered into the light-guiding plate 22. FIG. 4A shows light passages in the case of the light-guiding plate 22 of this embodiment, and FIG. 4B shows light passages in the case of the light-guiding plate 29 of a conventional embodiment. One side face 29a on the light source side of the light-guiding plate 29 of the conventional embodiment, corresponding to the one side face 22a of the light-guiding plate 22 of this embodiment, is formed in a relatively smooth shape and is disposed nearly perpendicularly to the light-outgoing surface 29d.

In addition to directly entering the light-guiding plate 22, light from the light source 23 is reflected by the reflection plate 24 and then enters into the light-guiding plate 22. Accordingly, although there are many light beams entering in various directions 28a and 28b, the quantity of light entering in the direction 28a perpendicular to the side face on the light source side is larger than the quantity of light entering in other directions 28b. In the case of the light-guiding plate 22 of this embodiment, the light beam in the direction 28a shown in FIG. 4A is refracted by the uneven surface of the one side face 22a of the light-guiding plate 22 and enters into the light-guiding plate 22. Part of the light is reflected by the uneven surface, further reflected by the reflection plate 24 and then enters into the light-guiding plate 22. Since the incoming light is refracted by the one side face 22a, the probability of light reaching the surface 22c or the light-outgoing surface 22d of the light-guiding plate 22 is relatively high. The light having reached the surface 22c is reflected or diffused by the diffuse reflection plate 25 as described above and reflected by the reflection plate 26, then emitted from the light-outgoing surface 22d.

On the other hand, in the case of the light-guiding plate 29 of the conventional embodiment, as shown in FIG. 4B, the quantity of light in the direction 28a, which is reflected by the one side face 29a, is larger than that in the case of the light-guiding plate 22. Therefore, the quantity of light entering into the light-guiding plate 29 becomes smaller. In addition, since the incoming light almost wholly travels straight, the probability of the light reaching the surfaces 29c and 29d is relatively lower than that in the case of the light-guiding plate 22. Therefore, the quantity of light emitting from the light-outgoing surface 29d of the light-guiding plates 29 is smaller.

In this embodiment, the sectional shape of each convex on the one side face 22a is an isosceles right triangle. Although the area of the one side face 22a is larger by $2/\sqrt{2}$ times (about 41%) than that in the case of the light-guiding plate 29 of the conventional embodiment, the quantity of light entering in the direction 28a perpendicular to the one side face 22a is larger than the quantity of light entering in other directions 28b as described above. It is thus assumed that the increase in the quantity of light entering the light-guiding plate 22 is less than 41%.

Even in the case of the light-guiding plate 29 of the conventional embodiment, although light reflected by the one side face 29a of the light-guiding plate 29 is reflected by the reflection plate 24 and eventually enters into the light-guiding plate 29, the quantity of the incoming light per unit time in the case of the light-guiding plate 22 of the present embodiment is larger than that in the case of the conventional embodiment.

Figure 5A:
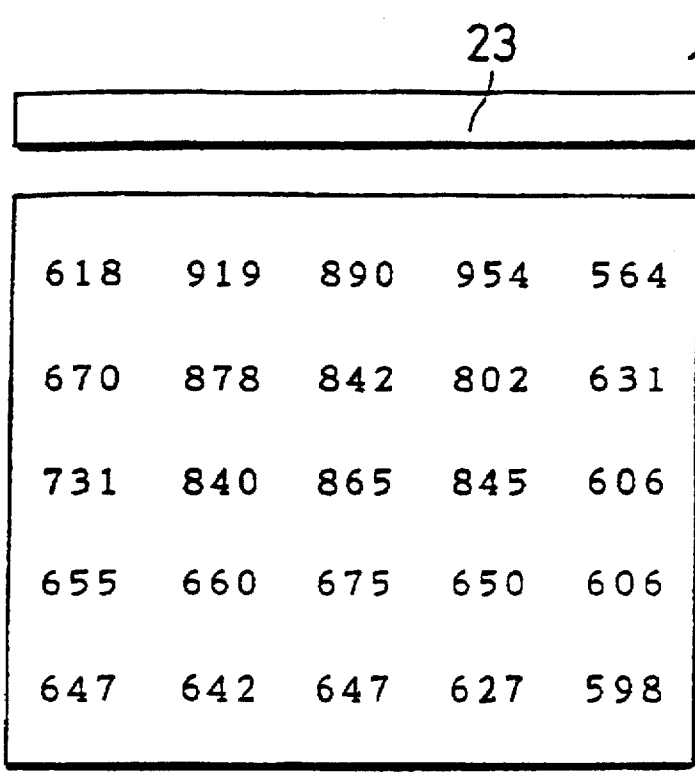
FIGS. 5A and 5B are plan views showing the distribution of luminance values in a produced lighting device.
Figure 5B:
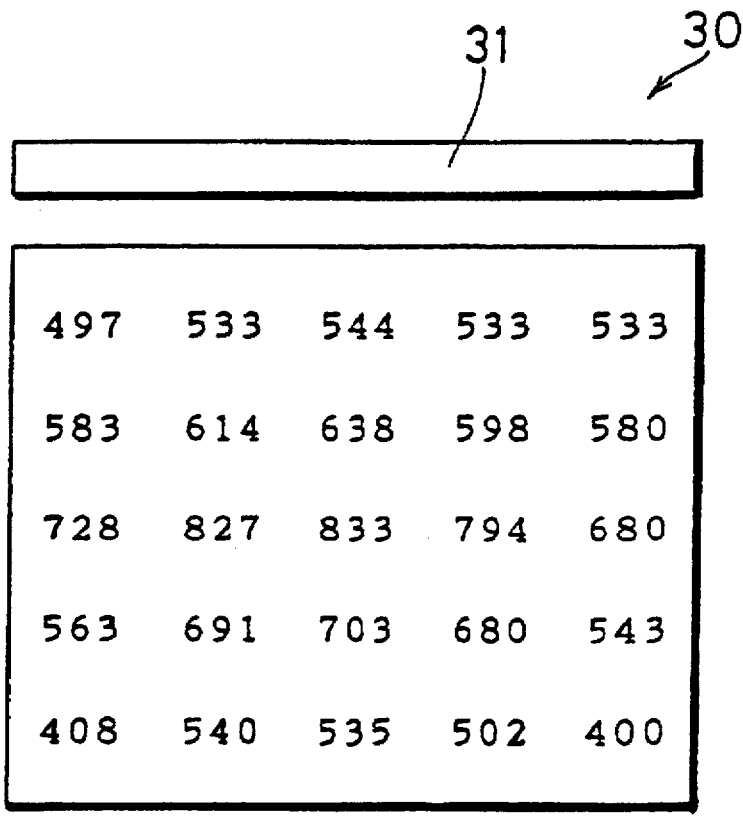
Figure 6:
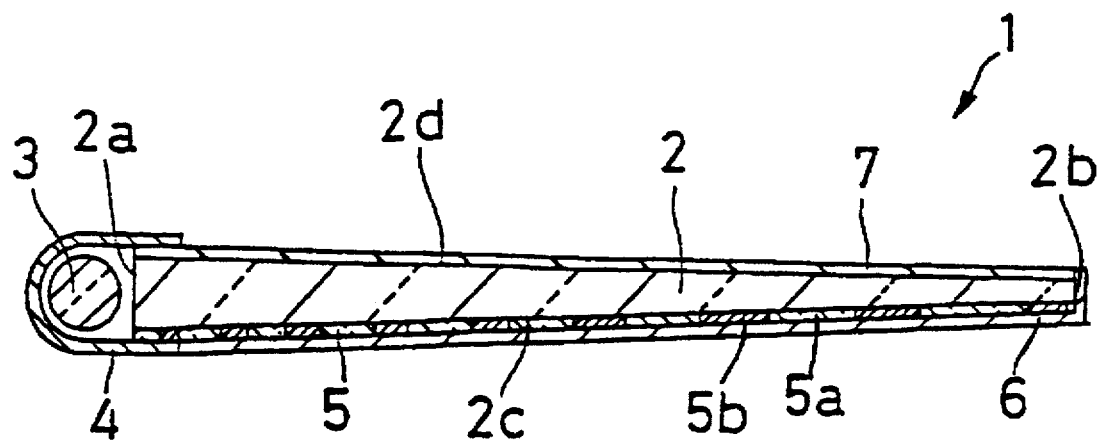
FIG. 6 is a sectional view showing the structure of a conventional lighting device 1.
Figure 7:
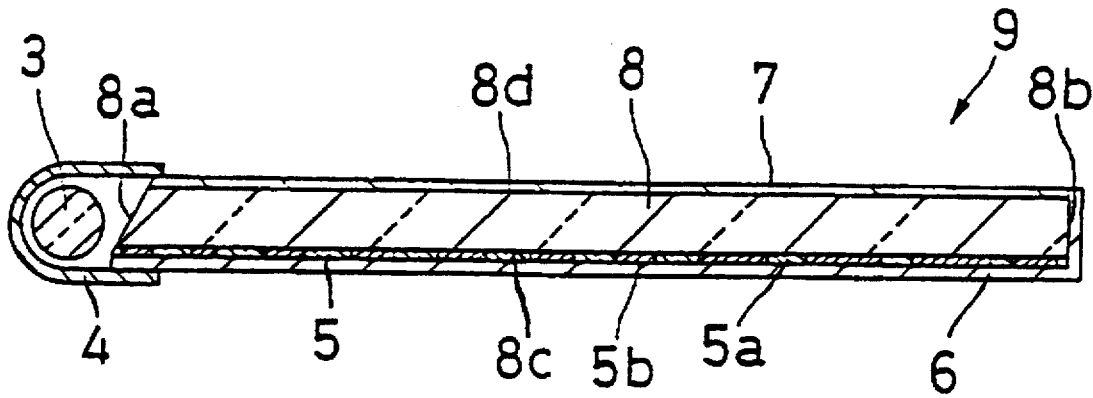
FIG. 7 is a sectional view showing the structure of another conventional lighting device 9.
Figure 8:
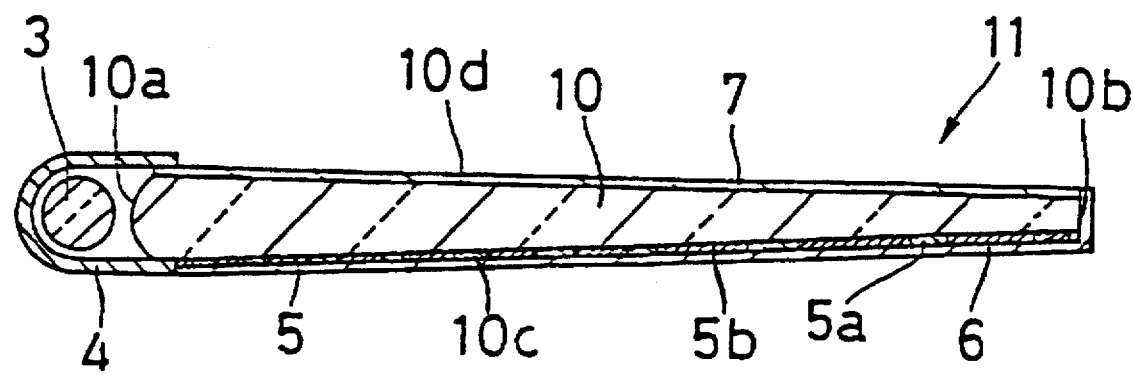
FIG. 8 is a sectional view showing the structure of still another conventional lighting device 11.

FIGS. 5A and 5B are plan views showing the distribution of luminance values of the lighting device having been produced. FIG. 5A shows the result of measurement on the lighting device 21 of the present embodiment, and FIG. 5B shows the result of measurement on the lighting device 30 of the conventional embodiment, in which the light-guiding plate 29 is used. Numerals in FIGS. 5A and 5B indicate the luminance values at all selected points. Luminance was measured by using a luminance measuring instrument, BM-7 made by Topcon Corporation, with the tube current of the light sources 23 and 31 set to 6 mA. The unit of luminance is cd/m$^2$. In the case of the lighting device 21 of the present embodiment, the average of luminance values indicated in FIG. 5A is 722.48 cd/m$^2$, and in the case of the lighting device 80 of the conventional embodiment, the average luminance is 603.2 cd/m$^2$. It is thus confirmed that the luminance of the lighting device 21 of this embodiment is significantly higher than that of the conventional embodiment.

As described above, according to the present embodiment, the luminance of the lighting device 21 is enhanced by making the side face 22a of the light-guiding plate 22 on the light source side of the light-guiding plate 22 uneven. When this kind of lighting device 21 is incorporated, for example, in a liquid crystal display apparatus, the luminance of the liquid crystal display apparatus is also enhanced. Furthermore, since the quantity of light entering the light-guiding plate 22 and the quantity of light emitted from the light-guiding plate 22 are enhanced by properly selecting the shape of the light-guiding plate 22, high luminance can be obtained with low power consumption. When the lighting device is incorporated, for example, in a liquid crystal display apparatus, the power consumption of the liquid crystal display apparatus can be reduced.

Any kinds of light sources may be used as the light source 23. For example, a hot cathode tube may be used instead of a cold cathode tube. The number of the tubes is not limited to one, but a plurality of tubes may be used. Besides, the outer diameter of the tube may have various values, such as 2 mm or 4 mm instead of 3 mm.

The material of the light-guiding plate 22 is not limited to an acrylic resin, but PC or the like may be used. The shape of the light-guiding plate 22 is not limited to a shape wherein the thickness of the light-guiding plate 22 is thinner in the direction from the one side face 22a to the other side face 22b in the case of the present embodiment, but the light-guiding plate 22 having the same thickness throughout may be used, or the central portion of the light-guiding plate 22 may be made thinnest. The light source 23 is not limited to be disposed on the side of the one side face 22a of the light-guiding plate 22, but the light source may be disposed on the sides of both the one side face 22a and the other side face 22b. The convexes formed on the one side face 22a of the light-guiding plate 22 may also be formed on a different type of one side face 22a, which is inclined or semicylindrical.

Moreover, the materials, shapes and forming methods of the reflection plate 26 and the diffusion plate 27, and the material, size, arrangement conditions, shape and forming method of the diffuse reflection layer 25 are not limited to those described above, but any others may be used. Besides, a light-gathering layer may be provided on the diffusion plate 27. The light-gathering layer can be implemented, for example, by forming uneven portions which function as prisms on the light-outgoing surface 22d of the light-guiding plate 22. By simultaneously forming the light-gathering layer, the convexes on the one side face 22a and the diffuse reflection layer 25, it is possible to enhance the production efficiency and to reduce the production cost of the lighting device.

Moreover, the lighting device 21 may be incorporated in not only a liquid crystal apparatus but also any other display apparatuses which perform displaying by passing and shielding incoming light. The lighting device may also be incorporated in AV apparatuses, advertising display apparatuses etc.

Although the lighting device 21 to be incorporated in a display apparatus having a displaying region measuring a diagonal length of 9.4 inches has been described as an embodiment, the lighting device 21 may be modified by changing design conditions depending on the size of the region to be irradiated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A lighting device comprising:
 a nearly flat light-guiding plate having to opposing surfaces that are joined at each edge by a side face;
 a linear light source disposed along one side face of the light-guiding plate; and
 a reflection plate disposed on one surface of the light-guiding plate so as to cover at least the one surface, the lighting device which guides light having entered from the one side face of the light-guiding plate to the entire light-guiding plate, and emits the light through an opposing surface to the one surface of the light-guiding plate by reflecting by the reflecting plate, wherein
 convex protrusions are formed in parallel at minute pitches on the side face of the light-guiding plate disposed to face the light source.

2. The lighting device of claim 1, wherein a section of the convexes taken in a direction perpendicular to the side face of the light-guiding plate are disposed to face the light source are nearly triangular.

3. A lighting device comprising:
 a nearly flat light-guiding plate having to opposing surfaces that are joined at each edge by a side face;
 a linear light source disposed along one side face of the light-guiding plate; and
 a reflection plate disposed on one surface of the light-guiding plate so as to cover at least the one surface, the lighting device which guides light having entered from the one side face of the light-guiding plate to the entire light-guiding plate, and emits the light through an opposing surface to the one surface of the light-guiding plate by reflecting by the reflecting plate,
 wherein convex protrusions are formed in parallel at minute pitches on the side face of the light-guiding plate disposed to face the light source, and wherein the lighting device further comprises a diffuse reflection layer having light-shielding regions formed on the surface of the light-guiding plate, the light-shielding regions being disposed at equal intervals on respective imaginary lines which are parallel with the linear light source at equal intervals, and a number D of the imaginary lines and a number N of the convexes formed on the side face of the light-guiding plate satisfy the following relationship:

$$0.5D \leq N \leq 2D.$$

4. A lighting device comprising:

a nearly flat light-guiding plate having to opposing surfaces that are joined at each edge by a side face;

a linear light source disposed along one side face of the light-guiding plate; and a reflection plate disposed on one surface of the light-guiding plate so as to cover at least the one surface, the lighting device which guides light having entered from the one side face of the light-guiding plate to the entire light-guiding plate, and emits the light through an opposing surface to the one surface of the light-guiding plate by reflecting by the reflecting plate, wherein convex protrusions are formed in parallel at minute pitches on the side face of the light-guiding plate disposed to face the light source, and wherein a section of the convexes on the side face of the light-guiding plate disposed to face the light source have a section shape in the form of an isosceles right triangle when taken in a direction perpendicular to the side face.

* * * * *